United States Patent [19]
Hanson

[11] 3,797,964
[45] Mar. 19, 1974

[54] ROTARY WING APPARATUS

[76] Inventor: Thomas F. Hanson, 24204 Heritage Ln., Newhall, Calif. 91321

[22] Filed: June 24, 1971

[21] Appl. No.: 156,307

Related U.S. Application Data
[63] Continuation-in-part of Ser. No. 832,366, June 11, 1969, abandoned.

[52] U.S. Cl. .............................................. 416/134
[51] Int. Cl. ........................................... B64c 27/38
[58] Field of Search .......... 416/134, 135, 136, 138, 416/141, 230, 112–114

[56] References Cited
UNITED STATES PATENTS

| | | | |
|---|---|---|---|
| 2,757,745 | 8/1956 | Verhage et al. | 416/138 UX |
| 2,475,337 | 7/1949 | Platt | 416/147 |
| 3,261,407 | 7/1966 | Culver et al. | 416/112 |
| 3,330,362 | 7/1967 | Kastan | 416/135 X |
| 3,362,253 | 1/1968 | Ditlinger | 416/134 UX |
| 3,388,615 | 6/1968 | Ditlinger | 416/134 UX |
| 3,476,484 | 11/1969 | Brunsch | 416/230 |

FOREIGN PATENTS OR APPLICATIONS
1,334,446  7/1963  Germany ........................... 416/230

Primary Examiner—Everette A. Powell, Jr.
Attorney, Agent, or Firm—Daniel T. Anderson

[57] ABSTRACT

The specification discloses a novel wing, or blade, of the non-articulated or "rigid" type for a rotary wing aircraft. Tension, bending, and shear supporting elements such as bands of fibre glass are bonded in a force distributing manner to the body of the lifting blade and carried in a slender bonded fibre glass bundle-filler material assembly flexure arm from the inboard end of the lifting body to a hub attachment fixture. The resultant flexure member is stiff in tension but torsionally relatively very soft. Torsional strength and pitch control to the blade is provided by a pair of torsionally rigid torque tubes in plane with and in a straddled relation with the tension arm flexure member.

10 Claims, 5 Drawing Figures

Thomas F. Hanson
INVENTOR.

BY Daniel T. Anderson
ATTORNEY

Thomas F Hanson
INVENTOR.

BY Daniel T. Anderson
ATTORNEY

Thomas F. Hanson
INVENTOR.

ATTORNEY

ROTARY WING APPARATUS

This application is a continuation-in-part of the copending U.S. Pat. application Ser. No. 832,366, filed June 11, 1969, by the same inventor, and entitled ROTARY WING APPARATUS now abandoned.

BACKGROUND OF INVENTION

1. Field of the Invention

The invention relates generally to rotary wing aircraft and more particularly to improvements in non-articulated, lifting blades and their construction.

Although the invention has found particularly advantageous application in the field of general aviation rotary wing aircraft such as STOL/VTOL autogyro or helicopter types of craft and although for clarity and brevity much of the following discussion and description of examples of the invention relate thereto, it is stressed that the advantages of the invention are equally well manifest and beneficial in other air lift or propulsion apparatus including, for example, military, industrial, or common carrier rotor craft, variable pitch propulsion systems, non-powered rotary wing craft, tethered or towed craft, or the like.

2. Discussion of the Prior Art

The support and control linkage structure for connecting the root of a rotary wing to the hub apparatus has been the focus of much effort toward the making of helicopters and autogyros safer, longer lived, more reliable, and less expensive. The advent and development of the "rigid" rotor helicopter system, whereby blade flapping motion is accomplished by the elastic deformation of a cantilever beam or flexure member and the conventional flapping or teetering hinge is eliminated, provided a significant step toward greater strength and simplicity in rotor hub mechanisms. A second step was the introduction of a torsionally soft flexure or beam which allowed changes in blade pitch or angle of attack by elastic deformation. Theretofore, it had been the general practice to provide blade pitch control (freedom of motion about the feathering axis) by incorporating an articulated pitch control juncture or a rotary bearing between the blade and the hub.

An informative example of "rigid" rotor structure is shown in the Culver, Hanson, and Look U.S. Pat. No. 3,261,407 entitled "Helicopter Rotor System." In that patent, the hub is shown connected to the blade by a torsionally soft, tension supporting, flexure member which clearly is the main supporting structure for the blade. However, also connecting the central structure and the blade is shown a torque tube having a pitch horn, or "handle" attached thereto at the hub end and being torsionally affixed to the blade at its outer end. Torsional displacement of the torque tube through the pitch horn controls the pitch of the blade about its feathering axis and is permitted by the torsionally soft flexure arm.

The unitary concentric torque tube structure is massive and large in diameter and causes significantly deleterious aerodynamic drag. In addition, the flexure member, the primary and most critical supporting structure for the entire craft is hidden from view and cannot be inspected for fissures or other evidence of weakness or damage without a major disassembly, the process of which is itself a cause for safety concern requiring, subsequently, an involved inspection series. These considerations in combination have caused practical embodiments of such systems to be undesireably heavy and bulky and to preclude their incorporation in many rotary wing craft where they would otherwise have been advantageous.

Accordingly, it is an object of the present invention to provide novel rotary wing apparatus which is not subject to these and other disadvantages and limitations of the prior art.

It is another object to provide such apparatus which is exceedingly versatile in permitting freedom of design parameters.

It is another object to provide such apparatus which is significantly less massive, suffers much less aerodynamic drag, is mechanically simpler and less expensive to manufacture, and constitutes a significant advance in mechanical safety, ruggedness, reliability, and durability.

It is another object to provide such apparatus in which the primary tension carrying, flexure members may be open to visual inspection at all times. It is another object to provide such apparatus having an intrinsic damping mechanism for in-plane blade flexures and any resultant "ground resonance" phenomena. It is another object to provide such apparatus which may transmit, directly to the operator, signals representative of various particular life effects experienced by the blades.

It is another object to provide a flexure attachment which allows the use of fibre or filament composite structural elements while avoiding stress concentrations and complete dependence on adhesive bonding and/or clamping to carry the blade centrifugal force.

SUMMARY OF INVENTION

Very briefly, these and various other objects are achieved in accordance with the structural aspects of one example of the invention which includes a light weight rotary wing section adapted to be connected to a central hub fixture by a tension supporting flexure arm member which extends from the inner end of the win section to the hub connector. The flexure arm comprises one or more bands of high tensile strength filaments which extend into or over the surfaces of the wing section to which they are bonded for an appreciable portion of their length, along the flexure arm bundle, around the hub connector fixture, back along the flexure arm, and back to another bonded termination on or in the wing section. The bands of filaments in the flexure arm bundle are bonded to filler material to provide desired magnitudes of shear and bending strengths.

The tension forces carried by the connecting arm are thusly distributed over a large portion of the wing and they are transmitted to the hub through a continuous wrap around mechanism at the hub connector fixture whereby any failure of the adhesive bond between the load carrying bundles and the hub connector fitting will not result in catastrophic separation of the blade from the hub.

Wedge shaped elastomeric inserts may be, in some examples, provided between the load carrying filament bundles and the hub connector fitting to avoid deleterious concentrations or abrupt boundary conditions associated with the conveyance of tensile forces into and out of the filaments.

For blade pitch control a plurality of relatively small diameter torque transmissive tubes are interposed between the hub and the wing section. The torque tubes are functionally, and structurally, parallel and may be partially or wholly mutually redundant. At their outer ends, the torque tubes are connected, in a pitch control torque transmissive relation, to the root end of the wing section. At their hub end, the torque tubes are affixed to connector structure for bilaterally transmitting blade pitch signals between the lifting blades and, ultimately, the operator.

Further details of these and other novel features of the invention and their operation, including, for example, in-plane flexure damping apparatus, as well as additional objects and advantages of the invention will be made apparent and be understood from a consideration of the following description taken in view of the accompanying drawings which are presented by way of example only.

DESCRIPTION OF PREFERRED EMBODIMENTS

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard no attempt is made to show structural details of the apparatus in more detail than is necessary for a fundamental understanding of the invention. The description taken with the drawings will make it apparent to those skilled in the mechanical and aeronautical arts how the several forms of the invention may be embodied in practice.

Specifically, the detailed showing is not to be taken as a limitation upon the scope of the invention which is defined by the appended claims forming, along with the drawings, a part of this specification.

Figure 1:
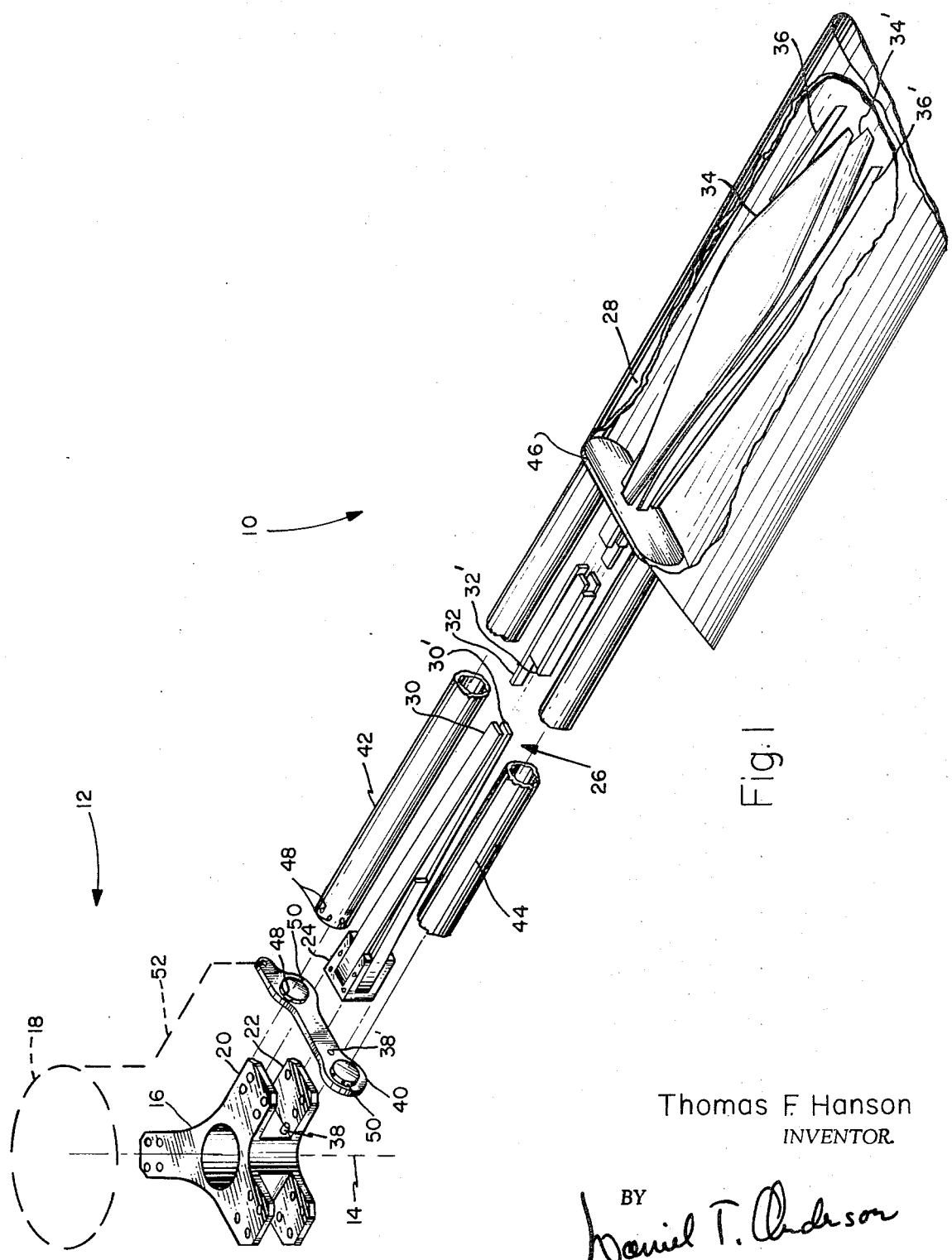
FIG. 1 is a perspective simplified and partially exploded view of apparatus constructed in accordance with the principles of the present invention.

In the longitudinally exploded view of FIG. 1, the inboard portion of a rotor blade assembly 10 of a three-blade rotary wing system 12 example is illustrated. The substantially vertical axis of the shaft of the autogyro or helicopter vehicle or the like is indicated at 14 about which a hub assembly 16 is coaxially disposed. Similarly disposed concentrically about the shaft axis 14 is a swash plate assembly indicated at 18, for coupling pitch control signals, to the blade assembly 10 and to the operator's station, not shown.

The hub assembly 16 comprises, in this example, a pair of flexure arm attachment upper and lower plate portions 20, 22, respectively. The attachment plate portions extend substantially horizontally and radially outwardly and are vertically spaced to receive, in a closely fitted relation, the root, connector fixture 24 of the flexure arm assembly 26. The connector fixture 24 and the hub attachment plates are bored, as indicated, for retaining a set of attachment bolts, now shown, which pass through both plates and the root fixture and may be of the character to be each secured by an appropriately lockable nut.

The principle, tension carrying structure between the lifting section 28 of the blade assembly 10 and the central hub is the flexure arm assembly 26. This arm component is characterized by being extremely rigid in tension while being relatively soft with respect to torsional and bending strain displacements.

The flexure arm construction is deemed best understood by noting that the central arm portion, as at 26, comprises two pairs of, in this example, fibre glass bundles arranged in an upper and lower set 30, 30' and a fore and aft set 32, 32'. Each of the bundles is shown as being substantially parallel or perpendicular to others in the two sets. Not shown in this somewhat schematic figure, for clarity of presentation, is a filler element disposed between and bonded to the four bundle segments in the flexure arm assembly 26 throughout its length between the fixture 24 and the wing section 28.

Considering the upper bundle 30, it is to be noted that it may be considered as beginning in or near the upper surface of the blade lift section 28 bonded integrally therewith in a stress distribution, fan-like array 34 and extending from the lift section along the central arm portion of the flexure assembly to the connector fixture 24. At its end, the upper bundle 30 passes over and around the fixture 24 and, in continuous manner, returns along the flexure arm as the lower bundle 30'. At the lift section 28, the lower bundle 30' diverges into a tapered fan-like array 34' of fibers which is, like the upper array 34, integrally bonded with a portion of the lower surface of the lift section.

Similarly the forward bundle 32 may be seen to begin gradually at 36 within the lift section where it may be bonded to spar members or other structure, not shown, and extend along a more forwardly portion of the lift section, reach along the central flexure arm portion, wrap around the connector fixture 24, and return therefrom along the flexure portion as the rear bundle 32'. Again, the bundle terminates gradually in a tapered manner within a more rearwardly portion of the lift section along a bundle 36' which is continuously bonded to the internal structure thereof.

The hub assembly 20, in this example, also carries a radially extending pivot pin element 38 the axis of which lies substantially parallel to the pitch axis of the rotor blade assembly 10 and upon which, by means of a pin receiving bore 38', is carried, with a pivotal degree of freedom thereabout, a blade pitch control plate member 40. The plate member 40 may be considered the base of a torsion and bend resistant rectangular frame comprising, as its forward and rearward sides, two parallel torque tubes 42, 44, respectively. The outboard base 46 or end of the torque rectangular frame is affixed to the lift section 28 in a bilateral torque transmissive relation therewith through a flexible coupling which transmits torsion and horizontal and vertical shear forces but is flexible with respect to and will not transmit flapwise and chordwise bending moments. The torque tubes 42, 44 may be relatively thin walled and metallic in structure and be affixed to the base plate members 40, 46 by screws, not shown, secured through a set of bores 48 and into tapped bores 48' arranged peripherally around short cylindrical retaining shoulders 50.

Torque force signals carried by the torque tube frame (40, 42, 44, 46) between the lift section 28 and the swash plate 18 are coupled bilaterally to the latter by a tension-compression link indicated at 52.

Figure 2:
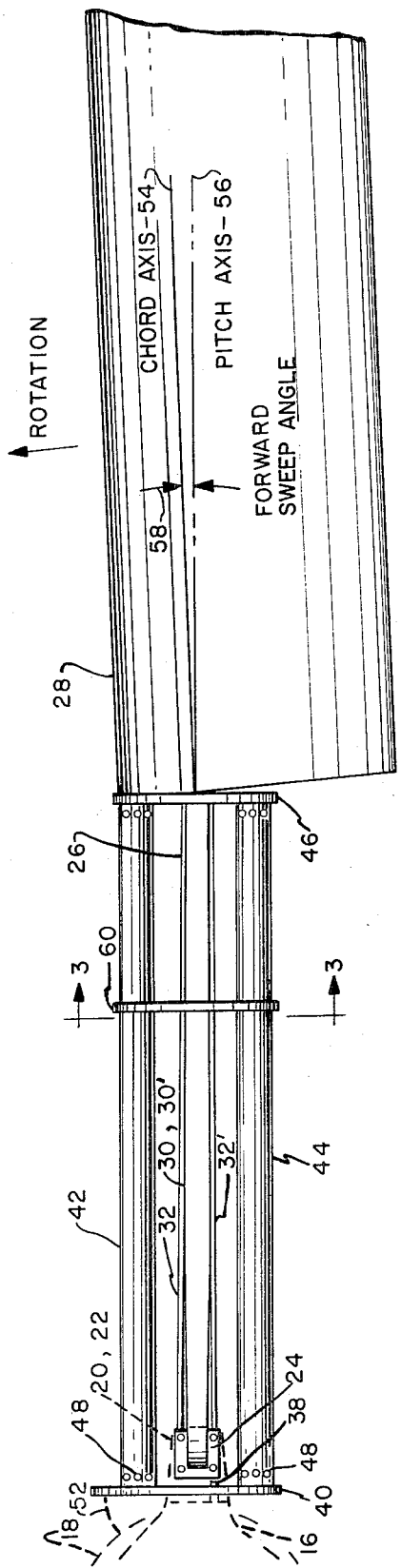
FIG. 2 is a plan view of a portion of the structure depicted in FIG. 1 including certain additional detail.

Referring to FIG. 2, much of the structure of the previous view is shown in plan and assembled, i.e., in a non-exploded manner. The hub assembly 16 is indicated in broken lines as is the swash plate 18 and the pitch force link 52.

The torque frame base plate member 40 is shown in its pivotally mounted relation on the pin 38 between the hub attachment plates 20, 22 to which the flexure arm connector fixture 24 is bolted just radially outwardly of the pivot pin 38. The torque tubes 42, 44, fastened at 48 to the base plate member 40 are shown similarly connected to the outboard plate member 46 which is, in turn, affixed to the blade lift section 28.

The assembly 26 is seen to comprise its two wraparound pairs of fiber bundles 30, 30' and 32, 32' which, in being bonded to their filler material contained therebetween, form an integral, bend and shear supportive, torsionally soft, tensionally stiff flexure arm.

Not previously pointed out is the angular relationship between the chord axis 54 of the blade lift section 28 and the blade pitch axis 56. In accordance with this example of the invention, these axes both lie substantially in the plane of the blade's travel with the former leading the latter by a forward sweep angle 58 of the order of, for example, ten degrees. The function of the forward sweep angle is to translate lift circumstances in the lift section into "pitch" signals which are transmitted via the torque frame 40, 42, 44, 46 and swash plate 18 to the pilot for a direct feel thereby of the particular lift conditions. The pilot feel thusly provided contributes appreciably to the precision of control by the pilot and to the safety and comfort of any passengers.

Figure 3:
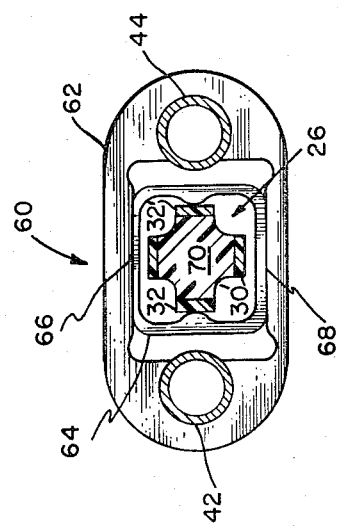
FIG. 3 is a cross-sectional view of a portion of the structure of FIG. 2 taken along the section lines 3—3 thereof.

In the cross-sectional view of FIG. 3 an in-plane flexure damping assembly 60 is illustrated. An outer frame 62 is affixed to the torque tubes 42, 44 and extends therebetween around the flexure arm assembly 26. An inner, damper frame 64 surrounds the flexure army and contacts its fore and aft fibre glass bands 32, 32' in a manner to permit torsional and vertical flexing strains. Horizontal flexing, on the other hand, can only occur by horizontal movement of the inner frame 64 with respect to the outer frame 62.

The latter relative motion is permitted by the mounting of the inner frame to the outer frame by fore and aft sliding joint means 66, 68. The sliding joints substantially preclude other degrees of relative motion between the frames and are provided with sliding contact surfaces exhibiting a relatively high magnitude of coulomb friction tending to absorb the energy associated with and thereby to damp any such motion.

The assembly 60 may be affixed along the torque tubes at a typical antinode of the in-plane flexure strain whereby to preclude or minimize any resonance oscillation of the rotor system with the airframe or of their combination with the landing gear while the craft is on the ground. Such oscillation, sometimes termed "ground resonance," in the prior art has been extremely destructive and is now understood to be pumped or driven by the rotary imbalance of the rotor system due to the in-plane co-acting flexing of the rotor blades.

Also illustrated specifically in FIG. 3 is the filler structure 70 referred to supra as being bonded between the fibre glass bands 30, 30', 32, 32' and extending along the length of the flexure arm assembly.

Figure 4:
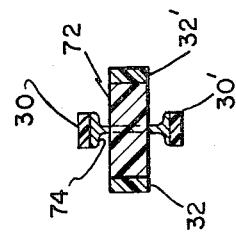
FIG. 4 is a cross-sectional view of an alternative example of the structure illustrated in FIG. 3.

In FIG. 4 an alternative example of an in-plane damping system is illustrated in which the filler structure 72, or portions thereof, is constructed from lossy, i.e., high hysterisis, in shear, elastomeric material. Thusly, the in-plane flexure damping is achieved by intrinsic or molecular friction instead of the extrinsic or coulomb type described in connection with FIG. 3. It may be noted, however, that the two examples may be combined by utilizing a lossy elastomeric substance for the filler structure 70. Also indicated in FIG. 4 is, in this example, a metallic, light-weight web extrusion element 74 which may couple deflection strains of all the fibre glass bundles into the lossy material.

Figure 5:
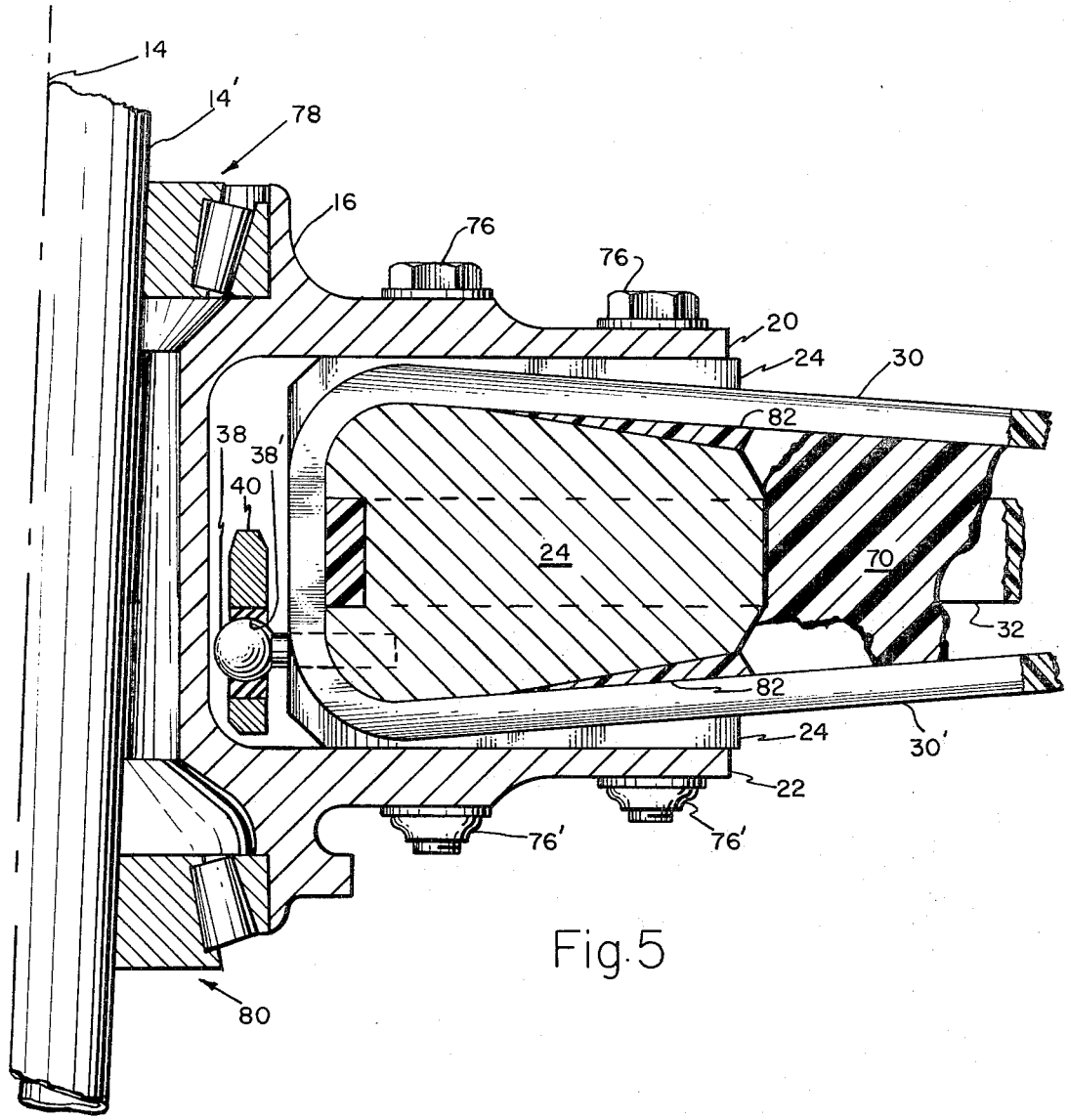
FIG. 5 is a longitudinal sectional view of a portion of the structure of FIG. 1.

Referring to FIG. 5, the longitudinal sectional view of a portion of the hub assembly 16 illustrates a substantially scaled example of the cooperative relationships of the hub attachment plate portions 20, 22 to the flexure arm connector fixture 24. A set of connector bolts 76 are shown passing through the plate portions and the connector fixture and secured by lock nuts 76'.

The hub assembly is rotationally mounted upon the shaft 14' by a set of roller bearing assemblies 78, 80. Similarly the pivot pin member 38, shown carried, in this example, by the fixture 24, for convenience in the assembling and disassembling and transporting of the rotor blade assembly 10 as a separate unit, and its pivotal mounting relationship with the pitch control plate member 40 is indicated in the figure.

The wrap-around nature of the fibre glass bundles 30, 30' at the root end of the connector fixture 24 and their relationship to the filler substance 70 is particularly manifest in the figure. Also to be noted is that the fibre glass bands are disposed in smoothly contoured channels or grooves formed in the connector fixture and that, to minimize stress discontinuities and concentrations where the bands leave the connector fixture, a wedge 82 of elastomeric plastic material is bonded between each of the fibre glass bands and its respective groove. By this means, the differential tension strains in the fibre glass and metal fixture are distributed by the plastic wedge over a large segment of the stressed materials instead of being concentrated at the exit lip of the groove in the fixture.

There have thus been disclosed and described a number of examples and structural aspects of novel rotary wing apparatus which achieve the objects and exhibit the advantages set forth hereinabove.

I claim:
1. Rotary wing apparatus comprising:
   lift section means;
   root end fixture means;
   tension, compression, bending, and shear supporting cantilever beam flexure arm means having first and second end portions and a torsionally soft mid portion interconnective segment;
   said cantilever beam flexure arm means comprising at least one torsionally soft, elongated band consisting of a composite of tension supportive fibres integrally bonded with filler material;
   said first end portion of said flexure arm means being affixed to said lift section means in tension, compression, bending, and shear transmissive relation therewith, and
   said at least one elongated bonded composite band extending along said mid portion interconnective segment of said flexure arm means, being disposed about said root end fixture means in a snugged wrap-around relation therewith, and thence returning along said mid portion segment all in a manner whereby said second end portion is affixed to said root end fixture means in tension, compression, bending, and shear transmissive relation therewith.

2. The invention as set forth in claim 1 in which the said fibres of the portions of at least some of said at least one band which are affixed to said lift section are disposed in an array which diverges within said lift section away from said connective segment of said flexure arm means.

3. The invention as set forth in claim 1 which further includes elastomeric, stress distributive transition means interposed and bonded between at least a portion of said at least one band and said root end fixture means for creating a continuous distribution of stress transmission between said fixture and said bands.

4. The invention as set forth in claim 1 which further includes at least one torsion stress transmissive number affixed to said lift section means in torque transmissive relation therewith and disposed contiguously along said flexure arm means for transmitting in a bypassing relation therewith, pitch signals to and from said lift section means.

5. The invention as set forth in claim 4 in which the number of torsion transmissive members is at least two.

6. The invention as set forth in claim 5 which further includes first and second end plate elements affixed to said torsion members, said first plate element being disposed contiguously to said lift section means and being affixed to the ends toward said lift section means of each of said torsion members in a torsion signal transmissive relation therewith, and said second end plate element being affixed to the opposite ends of each of said torsion members again in a torsion transmissive relation therewith whereby said first and second end plate elements are, through said torsion members, mutually intercoupled for the conduction of lift section pitch signals bilaterally therebetween.

7. The invention as set forth in claim 1 in which said mid portion interconnective segment of said flexure arm means is disposed substantially along a predetermined axis of pitch displacement and said lift section means defines a chord axis substantially coplanar with said pitch axis, and in which said chord axis is displaced angularly forwardly, with respect to the direction of forward rotation of said rotary wing apparatus, of said pitch axis to define a forward sweep angle of predetermined magnitude.

8. The invention as set forth in claim 5 which further includes in-plane displacement damping means carried by said torsion members and coupled to said interconnective segment of said flexure arm for absorbing the energy of in-plane displacement of said flexure arm means with respect to said torsion members.

9. The invention as set forth in claim 1 in which said filler material is elastomeric and is disposed between and coupled continuously to said bands along at least a portion of said interconnective segment of said flexure arm means, said elastomeric filler material being of the character exhibiting relatively high hysteresis losses with respect to in-plane deflection of said flexure arm means for absorbing energy associated therewith.

10. The invention as set forth in claim 1 in which said flexure arm means comprises at least one pair of said filler composite bands of tension supportive fibres.

* * * * *